United States Patent

[11] 3,624,686

| [72] | Inventor | Jean A. Beals<br>Route 8, Box 915 E, Pleasant Hill, Oreg. 97401 |
|---|---|---|
| [21] | Appl. No. | 878,645 |
| [22] | Filed | Nov. 21, 1969 |
| [45] | Patented | Nov. 30, 1971 |

[54] POCKETED APRON FOR TEACHING COLOR RECOGNITION
1 Claim, 5 Drawing Figs.

[52] U.S. Cl. ................................................ 35/8 R, 2/48, 40/129 A
[51] Int. Cl. ................................................ G09b 1/06
[50] Field of Search ........................................ 2/1, 47, 48, 74, 75, 244, 246; 35/31 R, 31 D, 31 F, 8 R, 22 R, 22 A, 56, 73, 28.3; 40/1.5, 1.6, 129 A, 322, 329; 46/DIG. 1, 116, 151, 157

[56] References Cited
UNITED STATES PATENTS

| 1,755,853 | 4/1930 | Waring | 35/35 R |
| 2,623,303 | 12/1952 | Mindel | 35/22 A |
| 2,726,397 | 12/1955 | Stirton | 2/48 |
| 3,063,718 | 11/1962 | Steinkamp | 46/DIG. 1 |
| 3,115,638 | 12/1963 | Kikas | 2/48 |
| 3,277,589 | 10/1966 | Berdan | 35/19 A |
| 3,371,829 | 3/1968 | Phillips | 40/1.5 X |
| 3,471,962 | 10/1969 | Klein | 35/28 X |
| 3,484,974 | 12/1969 | Culmone | 40/129 A |
| 3,510,964 | 5/1970 | Dahners | 35/22 A |

FOREIGN PATENTS

| 1,443,353 | 5/1966 | France | 2/48 |

Primary Examiner—Harland S. Skogquist
Attorney—James D. Givnan, Jr.

ABSTRACT: An apronlike article of apparel having strips of attachment material thereon with cooperating strips of pressure-sensitive material on the backside of a multitude of pockets for removable attachment to the apron body. The pockets are of various colors for the teaching of color recognition.

PATENTED NOV 30 1971 3,624,686

JEAN A. BEALS
INVENTOR.

BY *[signature]*
AGENT

POCKETED APRON FOR TEACHING COLOR RECOGNITION

BACKGROUND OF THE INVENTION

The present invention relates generally to a teaching aid and more particularly to one embodied within an article of apparel in the nature of an apron with detachable pockets.

While the present art may be considered an active one, the contributions for the most part are in the nature of mechanical teaching devices having audiovisual components. The present invention concerns an article worn by the instructor and adapted to mount a plurality of readily detachable pockets each of same being of a different color.

The present invention is directed toward providing a teaching aid for the teaching of color recognition and is particularly useful in the teaching of children having what is termed color deficient sight often inaccurately referred to in the past as color blindness. The latter term does not define the handicap as in most instances the person is able to differentiate to some extent various colors.

The prior art, to the extent I am aware, does not provide teaching aids embodied in a piece of apparel for the teaching of colors to young children. More particularly the feature of readily attachable pockets permits the instructor to teach in a manner directed toward keeping a child's attention.

SUMMARY OF THE INVENTION

The invention is embodied in an item of wearing apparel having a multiplicity of pockets held in place thereon by means which permits both convenient removal as well as secure attachment of the pockets to the main body of the garment. The pockets are each of a different color and provided with a strip of attachable material cooperable with a second strip in place on the garment.

An important object of the instant invention is to provide an effective way for the teaching of colors to both young children as well as other individuals having color deficient sight. Toward this end a plurality of pockets are provided which may be attached to the basic garment in singular or multiple manner. Accordingly both color identification may be taught with later exercises requiring color distinction between two or more different colored pockets.

A further object is to provide a basic garment having interengageable attachment strips thereon with said strips permitting the convenient fingertip pressure attachment and removal of pockets from the garment. Expeditious attachment and removal of the pockets enables the instructor to keep the student's attention and further prevents the student from simply memorizing pocket location rather than the color impression. The pockets are of a size to receive articles of a specific color which may be small toys or other items particularly interesting to small children. Color identification is taught to young children by the teacher placing articles of a matching color into a pocket while the student observes. Use of the particular closure material described enables several weighty articles to be deposited in each pocket without risk of the separation from the garment.

DESCRIPTION OF THE PREFERRED EMBODIMENT

Figure 1:
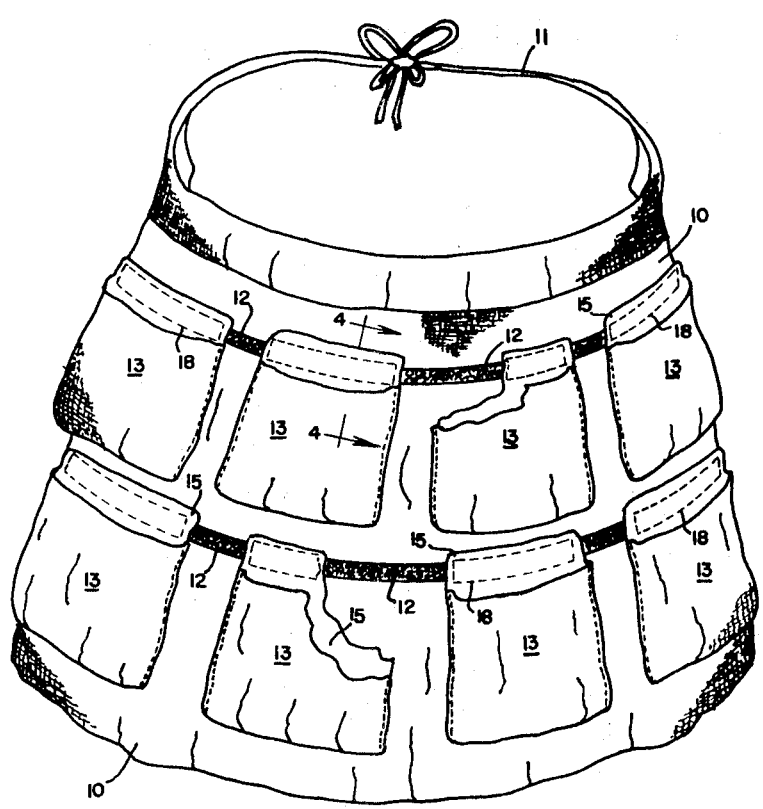
FIG. 1 is a perspective view of the teaching article with portions of pockets in place thereon broken away.

With continuing reference to the drawing wherein reference numerals indicate parts similarly identified in the following specification, the reference numeral 10 indicates an apron-type article of apparel very similar to an ordinary kitchen apron having ties at 11 for attachment about the wearer's waist. While a kitchen-type apron has been disclosed the invention is equally adaptable to other like articles of apparel as will be subsequently apparent.

Horizontally disposed on apron 10 are a pair of strips 12 each bearing elements interengageable with later described strips carried by apron pockets indicated at 13. The strips are vertically spaced on the apron body in a manner to suspend vertically spaced-apart pockets in nonoverlapping relationship. As shown in the sectional view of FIG. 4 the flexible material strip 12 is sewn crosswise to the apron body 10 by stitching 14 along the strip margins.

Figure 4:
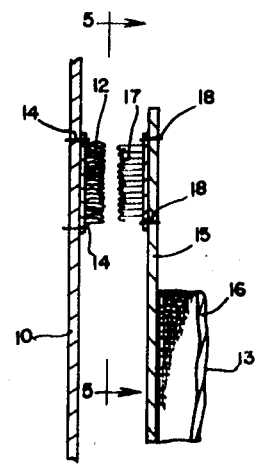
FIG. 4 is an enlarged sectional view taken along line 4—4 of FIG. 1 and showing details of the attachment strips.
Figure 2:
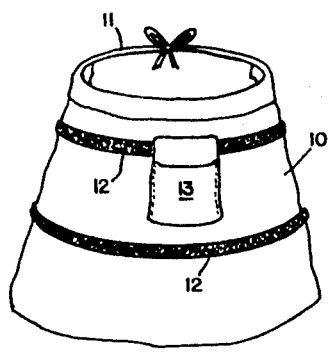
FIGS. 2 and 3 are views similar to FIG. 1 with different numbers of pockets attached to the basic article.
Figure 5:
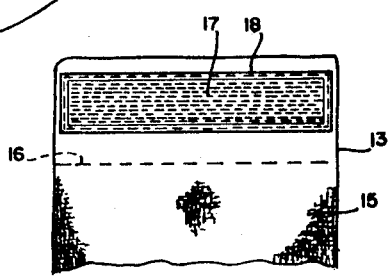
FIG. 5 is a view taken along line 5—5 of FIG. 4 showing pocket attachment means.

Each pocket 13 is of a different color cloth material and having a back portion 15 of slightly longer length than a front portion indicated at 16. Secured crosswise and adjacent the upper edge of the back portion 15 is a strip 17 of pocket attachment material which is cooperable with the material of the first described strips 12. Each strip 17 is stitched at 18 along its marginal areas to the backside of the pocket back 14 and includes projecting elements as seen in FIG. 4 interengageable with the first described strip material.

The attachment means consisting of strips 12 and 17, the latter located on the back of each pocket, are strips of synthetic material which adhere when pressed together, the material being commercially available under the trademark Velcro. The cooperable strips 12 and 17 are different in that the strips 12 have a "fleecy" appearance with the synthetic material being of looped construction. Strips 17 are of burr-like appearance having a multitude of flexible hooklike projections engageable with the loops of strip 12 upon fingertip pressure being exerted adjacent the pockets' upper edge. The attachment material is capable of repeated engagements and separations without adversely effecting its holding capability of importance when a pocket is filled with several like-colored articles. Further as later mentioned, the pockets attached along their upper edges are capable of supporting a variety of articles of considerable weight without distorting the desired contour of the main apron body or the pocket itself. Pocket walls 15 and 16 are stitched to provide an upwardly opening pocket in which a variety of articles are temporarily stored.

Figure 3:
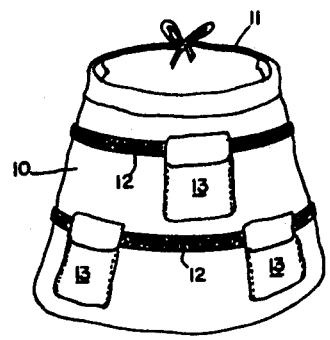

In use, the apron is worn in the usual manner with various numbers of different colored pockets 13 in place thereon. In most teaching situations the instructor begins with the teaching of one color and hence uses a single pocket in place on the apron. Small articles of like color are placed into the pocket whereupon each child then retrieves with one article and identifies it and its color. A second and third pocket are individually used in a like manner after which the instructor may jointly position the pockets in place as shown in FIG. 3. The students may then be asked to identify particular items and colors from any of the three pockets. Further transparent sheets may be used with the pockets to demonstrate color combinations.

Of importance to the invention is the feature of the rapid attachment achieved by use of the Velcro material. The instructor may quickly substitute or add pockets of other colors and, further, the pocket location on the apron body 10 may be conveniently changed to prevent the child from simply remembering the location of a colored pocket.

The invention having thus been described what I desire to secure under a Letters Patent is:

1. An apron for use as a teaching aid in the teaching of color recognition to young children, said apron comprising,
   a main apron body for wearing by an instructor,
   a pair of strips sewn to the apron with each strip having engageable elements thereon along the length of the strips, said strips in spaced-apart parallel relationship to one another and extending horizontally crosswise of said main body, and
   pockets of different colored cloth material attachable in rows to each of said strips, each of said pockets being of a size to receive during use of the apron a quantity of small articles having a color corresponding to that of the pocket cloth material, each pocket including a rear portion of greater vertical dimension than the remaining portion of the pocket, a strip sewn to the backside of said rear portion and extending crosswise of the upper edge thereof, said strip having projecting elements thereon interengageable with the elements on one of the said first-mentioned parallel strips to suspend in a secure manner a loaded pocket in place on the apron until intentional separation thereof by the instructor.

* * * * *